US 8,352,698 B2

(12) United States Patent
Higuchi et al.

(10) Patent No.: US 8,352,698 B2
(45) Date of Patent: Jan. 8, 2013

(54) INFORMATION PROCESSING APPARATUS, INFORMATION PROCESSING METHOD AND COMPUTER READABLE MEDIUM

(75) Inventors: Hiroshi Higuchi, Ebina (JP); Yuki Tsuchitoi, Ebina (JP); Masafumi Ono, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 350 days.

(21) Appl. No.: 12/715,518

(22) Filed: Mar. 2, 2010

(65) Prior Publication Data

US 2011/0016286 A1 Jan. 20, 2011

(30) Foreign Application Priority Data

Jul. 15, 2009 (JP) ................................ 2009-167146

(51) Int. Cl.
*G06F 12/08* (2006.01)
*G06F 12/00* (2006.01)

(52) U.S. Cl. ........................................ 711/170; 711/203

(58) Field of Classification Search .................. 711/170, 711/172, 203, 205–209, E12.001
See application file for complete search history.

(56) References Cited

U.S. PATENT DOCUMENTS

| 6,378,059 | B1 * | 4/2002 | Miyoshi | 711/203 |
| 2003/0126398 | A1 * | 7/2003 | Shinozaki | 711/206 |
| 2006/0149919 | A1 * | 7/2006 | Arizpe et al. | 711/206 |
| 2008/0098196 | A1 * | 4/2008 | Miyamoto | 711/203 |
| 2009/0019253 | A1 * | 1/2009 | Stecher et al. | 711/207 |

FOREIGN PATENT DOCUMENTS

| JP | 11-238015 A | 8/1999 |
| JP | 2000-276404 A | 10/2000 |
| JP | 2009-20881 A | 1/2009 |

* cited by examiner

*Primary Examiner* — Tuan Thai
*Assistant Examiner* — Zhuo Li
(74) *Attorney, Agent, or Firm* — Sughrue Mion, PLLC

(57) ABSTRACT

An information processing apparatus includes: a memory that stores a process identifier for identifying a process uniquely, a virtual address which is an address of a memory space available in the process, a physical address corresponding to the virtual address, and a continuous memory capacity assigned to the process so as to be associated with each other; and a memory capacity setting section that, when changing a process to an executable state, sets the continuous memory capacity to be stored in the memory. The memory capacity setting section determines the continuous memory capacity based on: a memory capacity that the process requires; a memory capacity of an unused continuous region in a physical memory; and a memory capacity based on restriction of memory size dependent on a central processing unit in a computer.

7 Claims, 10 Drawing Sheets

FIG. 4

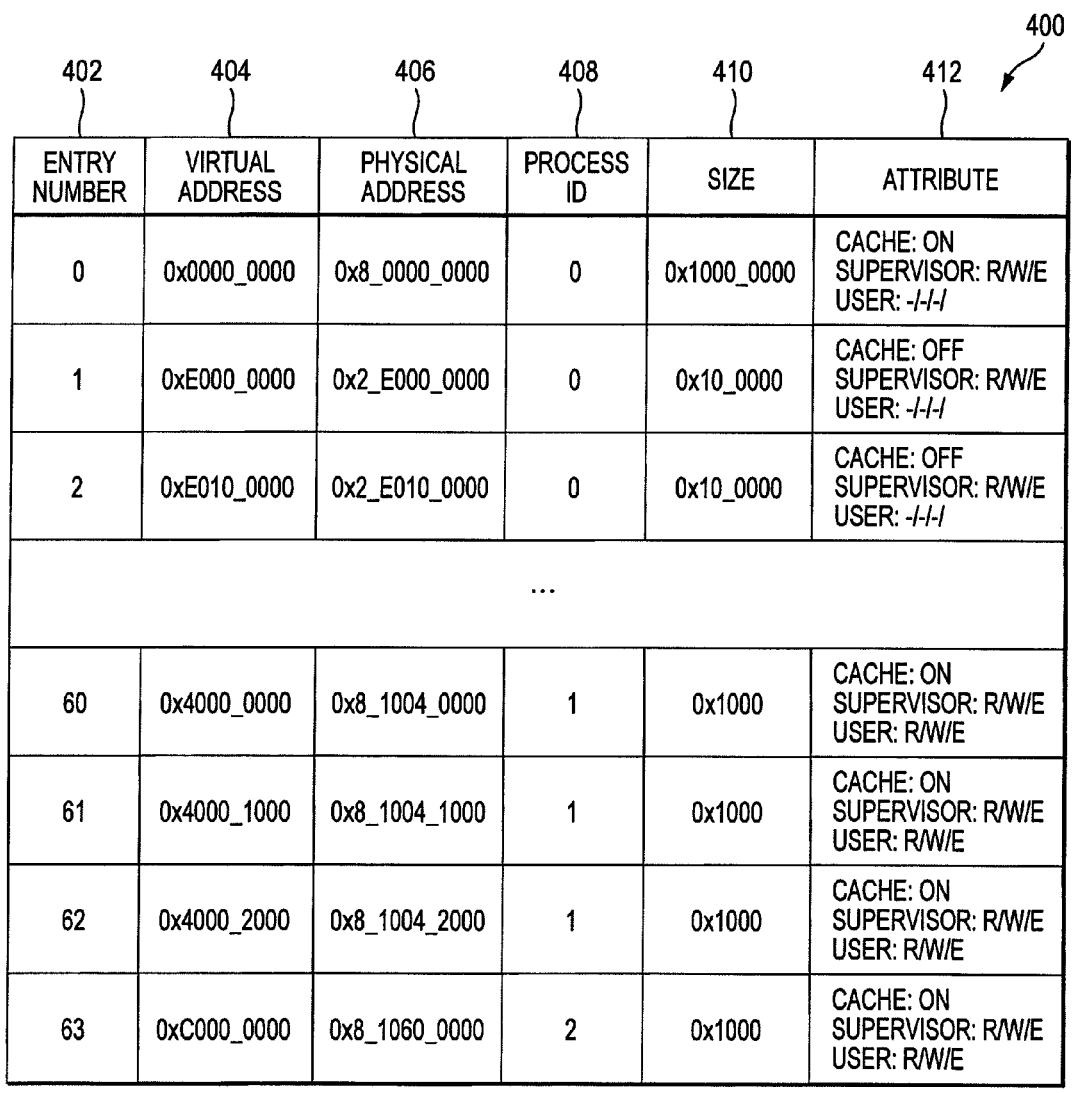

| ENTRY NUMBER | VIRTUAL ADDRESS | PHYSICAL ADDRESS | PROCESS ID | SIZE | ATTRIBUTE |
|---|---|---|---|---|---|
| 0 | 0x0000_0000 | 0x8_0000_0000 | 0 | 0x1000_0000 | CACHE: ON<br>SUPERVISOR: R/W/E<br>USER: -/-/- |
| 1 | 0xE000_0000 | 0x2_E000_0000 | 0 | 0x10_0000 | CACHE: OFF<br>SUPERVISOR: R/W/E<br>USER: -/-/- |
| 2 | 0xE010_0000 | 0x2_E010_0000 | 0 | 0x10_0000 | CACHE: OFF<br>SUPERVISOR: R/W/E<br>USER: -/-/- |
| ... | | | | | |
| 60 | 0x4000_0000 | 0x8_1004_0000 | 1 | 0x1000 | CACHE: ON<br>SUPERVISOR: R/W/E<br>USER: R/W/E |
| 61 | 0x4000_1000 | 0x8_1004_1000 | 1 | 0x1000 | CACHE: ON<br>SUPERVISOR: R/W/E<br>USER: R/W/E |
| 62 | 0x4000_2000 | 0x8_1004_2000 | 1 | 0x1000 | CACHE: ON<br>SUPERVISOR: R/W/E<br>USER: R/W/E |
| 63 | 0xC000_0000 | 0x8_1060_0000 | 2 | 0x1000 | CACHE: ON<br>SUPERVISOR: R/W/E<br>USER: R/W/E |

FIG. 6A

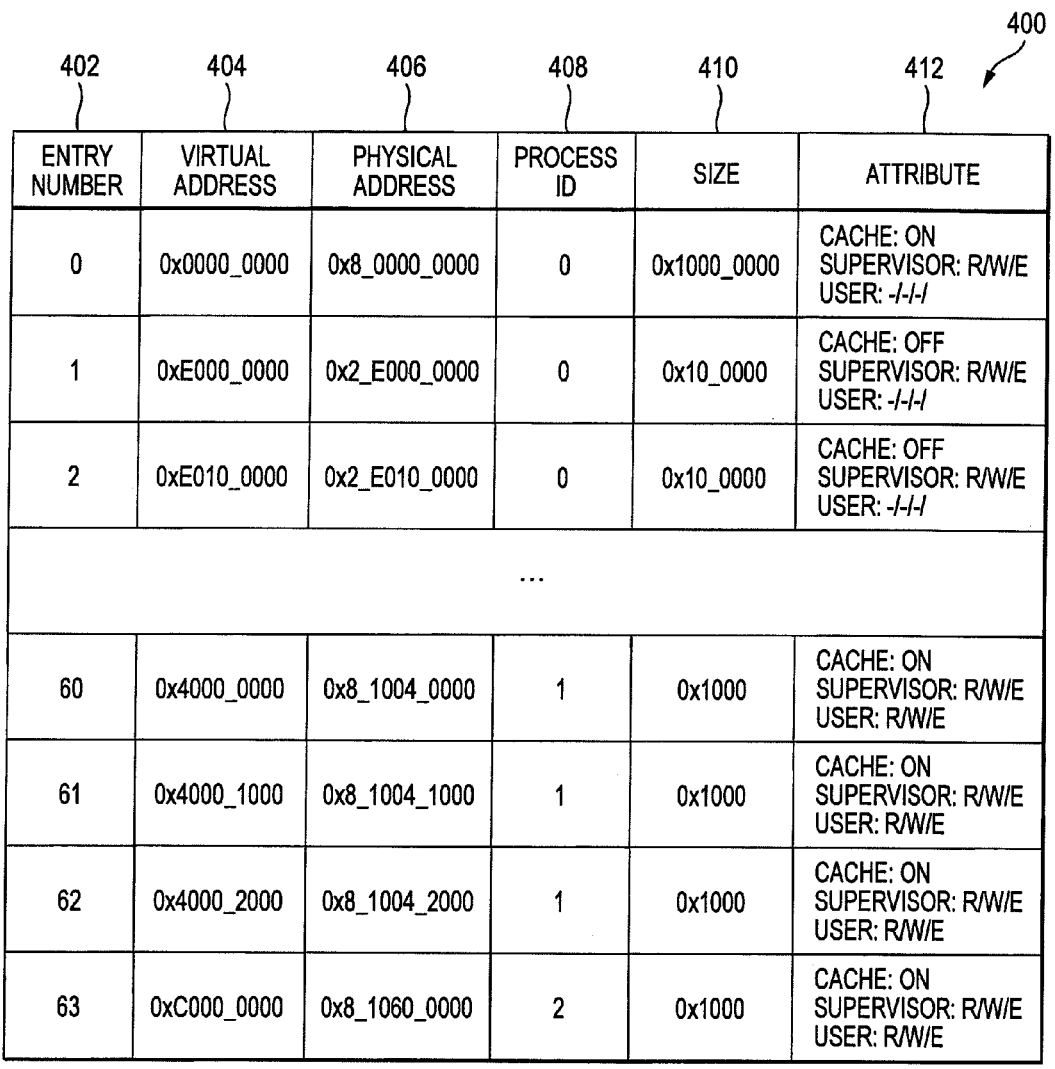

| ENTRY NUMBER | VIRTUAL ADDRESS | PHYSICAL ADDRESS | PROCESS ID | SIZE | ATTRIBUTE |
|---|---|---|---|---|---|
| 0 | 0x0000_0000 | 0x8_0000_0000 | 0 | 0x1000_0000 | CACHE: ON<br>SUPERVISOR: R/W/E<br>USER: -/-/- |
| 1 | 0xE000_0000 | 0x2_E000_0000 | 0 | 0x10_0000 | CACHE: OFF<br>SUPERVISOR: R/W/E<br>USER: -/-/- |
| 2 | 0xE010_0000 | 0x2_E010_0000 | 0 | 0x10_0000 | CACHE: OFF<br>SUPERVISOR: R/W/E<br>USER: -/-/- |
| ... | | | | | |
| 60 | 0x4000_0000 | 0x8_1004_0000 | 1 | 0x1000 | CACHE: ON<br>SUPERVISOR: R/W/E<br>USER: R/W/E |
| 61 | 0x4000_1000 | 0x8_1004_1000 | 1 | 0x1000 | CACHE: ON<br>SUPERVISOR: R/W/E<br>USER: R/W/E |
| 62 | 0x4000_2000 | 0x8_1004_2000 | 1 | 0x1000 | CACHE: ON<br>SUPERVISOR: R/W/E<br>USER: R/W/E |
| 63 | 0xC000_0000 | 0x8_1060_0000 | 2 | 0x1000 | CACHE: ON<br>SUPERVISOR: R/W/E<br>USER: R/W/E |

FIG. 6B

CONNECT OF TLB (NO. 63 AFTER OCCURRENCE OF TLB MISS EXCEPTION)

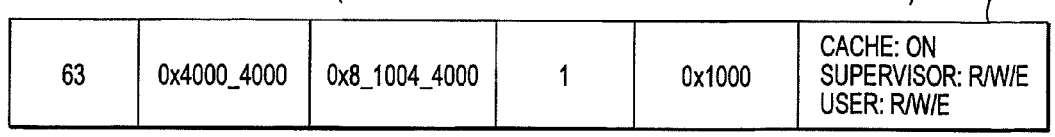

| 63 | 0x4000_4000 | 0x8_1004_4000 | 1 | 0x1000 | CACHE: ON<br>SUPERVISOR: R/W/E<br>USER: R/W/E |

INFORMATION PROCESSING APPARATUS, INFORMATION PROCESSING METHOD AND COMPUTER READABLE MEDIUM

CROSS-REFERENCE TO RELATED APPLICATIONS

This application is based on and claims priority under 35 USC 119 from Japanese Patent Application No. 2009-167146 filed on Jul. 15, 2009.

BACKGROUND

1. Technical Field

The present invention relates to an information processing apparatus, an information processing method and a computer readable medium.

2. Related Art

There is a virtual memory as a technique for using a memory space with a larger capacity than a main memory (real memory) mounted in a computer. When executing a program read on the virtual memory, an address (virtual address) of the virtual memory is required to be converted into an address (real address) of the main memory.

SUMMARY

According to an aspect of the invention, An information processing apparatus includes: a memory that stores a process identifier for identifying a process uniquely, a virtual address which is an address of a memory space available in the process, a physical address corresponding to the virtual address, and a continuous memory capacity assigned to the process so as to be associated with each other; and a memory capacity setting section that, when changing a process to an executable state, sets the continuous memory capacity to be stored in the memory. The memory capacity setting section determines the continuous memory capacity based on: a memory capacity that the process requires; a memory capacity of an unused continuous region in a physical memory; and a memory capacity based on restriction of memory size dependent on a central processing unit in a computer.

BRIEF DESCRIPTION OF THE DRAWINGS

Exemplary embodiment(s) of the present invention will be described in detail based on the following figures, wherein:

FIG. 4 is an explanatory view showing an example of the data configuration of a TLB;

FIGS. 6A and 6B are explanatory views showing an example of change of a TLB in the processing of TLB miss exception;

DETAILED DESCRIPTION

Figure 1:
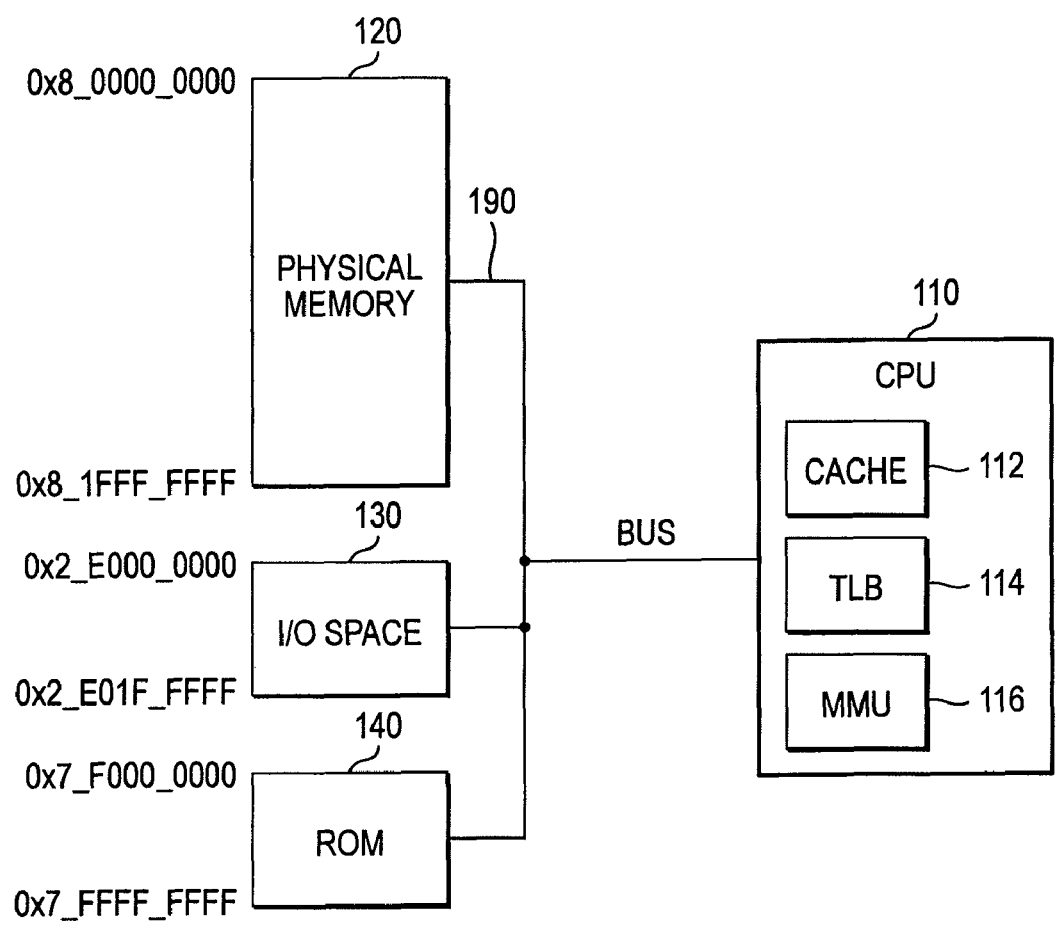
FIG. 1 is a view showing the conceptual module configuration in a configuration example of hardware for realizing the present exemplary embodiment.

First, before describing the exemplary embodiment, the premise or a virtual memory which uses the present exemplary embodiment will be described. Moreover, an object of this explanation is to make the present exemplary embodiment easily understood.

A virtual memory is a storage space which may be considered as a main memory that can be used by a user (process) of a computer system, and a virtual address is mapped to an actual address.

In a multi-process system using a process, a virtual memory space which is independent for every process is generated. The virtual memory space is made to match a physical memory space which exists physically, and an application which operates as a process operates only using an address of the virtual memory space. In addition, the process refers to an execution unit of a program in the operating system (OS). That is, the OS controls execution of a program in the process unit.

This virtual memory method is used in order to realize the following things.

(1) Since each process exists in a different memory space, it is possible to prevent each process from erroneously interfering with other processes. Moreover, since it is not possible to access or rewrite the data illegally, the safety can be ensured.

(2) A developer can develop an application without caring about the actual amount of physical memory or an actual address.

On the other hand, it is necessary to perform conversion between a virtual space, which is assigned for every process, and a corresponding physical space. When a process accesses a virtual address, an address of the access destination should be converted into a physical address by a certain method. In addition, a mapping table between a virtual address and a physical address for performing conversion needs to be managed in a physical memory. This address conversion processing and management of the mapping table need to be performed by a CPU or an OS or MMUs (Memory Management Units) mounted in both of them.

Generally, a TLB (Translation Look-aside Buffer) for efficiently performing memory conversion is prepared in a CPU. Since the mapping information on a virtual address and a physical address is stored in the TLB, the CPU performs a search in the TLB when access to a virtual address occurs and then converts the virtual address into a physical address.

However, since there is a constraint in the physical size of a TLB or the cost, it is difficult to store all the mapping information (for example, a TLB of the PowerPC (registered trademark) 440 is 64 entries). For this reason, a virtual address to be searched may not exist in the TLB. If the searched virtual address does not exist in the TLB, the CPU makes exception (TLB Miss exception) occur so that the OS updates the TLB. In TLB Miss exception processing, the OS searches a physical address corresponding to the requested virtual address from the mapping table managed in the physical memory and then updates the TLB. When the CPU returns from the exception processing, the CPU performs address conversion using the TLB in order to convert the virtual address into the physical address (refer to FIGS. 5, 6A, and 6B).

From the historical circumstances, Many OSs manage the mapping information in a unit (4 KB) called a page. If consecutive access to the virtual space of 2 GB is performed, TLB Miss exception occurs at least (2×1024×1024×1024)÷(1×1024×1024)=524288 times. Since the TLB Miss exception processing is software processing using an OS, an overhead corresponding to 524288 times occurs. In addition, since an executed program itself operates on the virtual address, an additional overhead caused by address conversion processing for program execution also occurs. These overheads have direct influences on the performance of an application.

In order to reduce the overhead, it is preferable to simply increase the size of a page. If a page unit is set to 1 MB, occurrence of TLB Miss exception can be reduced to (2×1024×1024×1024)÷(1×1024×1024)=2048 times. However, since a memory management unit is enlarged if the page size is increased, a memory space is fragmented or a useless region which cannot be used increases. For this reason, in an integrated system which has a limited memory capacity, it is difficult to adopt the above method. Moreover, since the page unit is set to 4 KB in most OSs, software made on the assumption that the page unit is 4 KB exists plentifully. Since changing the page unit largely has an influence on the whole system, the risk is high in terms of quality assurance.

Moreover, as another improved method, there is a method of efficiently using a TLB of a CPU. For example, when a TLB supports not only the mapping information of a virtual address and a physical address and size designation of the mapping region, the mapping information of a continuous region can be collectively registered in one TLB. Usually, the mapping information of one page is assigned to one TLB. If the number of entries in a TLB is not 64, only 64 pages (4 KB×64=256 KB) can be registered in the TLB at the maximum. However, if a larger size can be set for a TLB, a larger region can be mapped by registering a plurality of pages of a continuous region in one TLB collectively. If a region of 256 pages continues, the space of 1 MB can be mapped in one TLB. As a result, not only the TLB can be saved, but also the occurrence of TLB Miss exception can be suppressed.

In this method, however, there are some restrictions. First, regarding the size designation of a TLB, the value which can be set is limited due to restriction on the memory size by the CPU.

For example, in the case of PowerPC (registered trademark) 440, the size can be selected from 1 KB, 4 KB, 16 KB, 64 KB, 256 KB, 1 MB, 16 MB, 256 MB, and 1 GB.

In addition, a virtual address and a physical address of a region need to be aligned in the designated size. In addition, the region to be mapped should be a continuous region. For this reason, it is difficult to adopt this method if it is not a system in which a memory map is statically decided beforehand. Moreover, the effect cannot be guaranteed in a process in which a memory map is dynamically generated for a discontinuous region. In particular, when multi-processing is performed in an integrated system of which deterministic performance is requested, prediction of the performance cannot be guaranteed in this method.

Hereinafter, an example of an exemplary embodiment which is suitable for realizing the invention will be described with reference to the accompanying drawings.

FIG. 1 is a view showing the conceptual module configuration in a configuration example of the present exemplary embodiment.

In addition, modules generally refer to logically separable components, such as software (computer program) and hardware. Therefore, the module in the present exemplary embodiment indicates not only a module in a computer program but also a module in the hardware configuration. Thus, in the present exemplary embodiment, explanations on a computer program, a system, and a method are also made. In addition, "store", "cause to be stored", and words equivalent thereto are used for convenience of explanation, and these words mean being stored in a storage device or making a control to be stored in a storage device in the case when the exemplary embodiment is a computer program. In addition, a module corresponds to a function in a one-to-one manner. However, one module may be realized using one program or a plurality of modules may be realized using one program. Alternatively, one module may be realized using a plurality of programs. In addition, a plurality of modules may be executed by one computer, or one module may be executed by a plurality of computers in a distribution or parallel environment. In addition, other modules may be included in one module. In addition, 'connection' referred to hereinafter is used not only for physical connection but also for logical connection (for example, transmission and reception of data, instruction, and reference relationship between data).

In addition, a system or an apparatus may be realized by connecting a plurality of computers, hardware, apparatuses, and the like to one another through a communication unit, such as a network (including communication connection of one-to-one correspondence), or may be realized using one computer, hardware, and an apparatus. The 'apparatus' and the 'system' are used as synonymous terms. "Set beforehand" refers to being set before target processing and is used as meaning including not only being set before processing of the present exemplary embodiment starts but also being set after processing of the present exemplary embodiment started according to situation and state at that time or situation and state until then as long as it is before target processing. Moreover, although the term "management" is used, this is used to mean "control", "manage", or "store data for control or management" according to the context.

Hereinafter, an embedded OS, more specifically, an OS which does not perform paging processing (processing of performing exchange between a program or data existing on a main storage device and a required program or data existing on an auxiliary storage device when a program or data required for execution does not exist on the main storage device) will be described as a main example.

An information processing apparatus which is the present exemplary embodiment is related with an MMU using a TLB in a multi-process environment of dynamically generating a memory space. As an example of the hardware configuration, the information processing apparatus includes a CPU 110, a physical memory 120, an I/O space 130, and a ROM 140 as shown in FIG. 1. These are connected to each other through a bus 190.

As a memory space, the physical memory 120 is assigned to 0x8_0000_0000 to 0x8_1FFF_FFFF, the I/O space 130 is assigned to 0x2E000_0000 to 0x2E01F_FFFF, and the ROM 140 is assigned to 0x7_F000_0000 to 0x7FFFF_FFFF. In addition, "0x" indicates that the subsequent numbers are expressed in hexadecimal, and "_" is inserted for every 4 digits of hexadecimal.

The CPU 110 has a cache 112, a TLB 114, and an MMU 116.

The cache 112 is used in order to improve the efficiency of transmission of data between the CPU 110 and the physical memory 120 or the like.

The TLB 114 is a storage device that stores a process identifier for identifying a process uniquely, a virtual address which is an address of a memory space that can be used in the process, a physical address corresponding to the virtual address, and the capacity of a continuous memory space assigned to the process so as to be associated with each other. For example, a TLB 400 illustrated in FIG. 4 is stored.

FIG. 4 is an explanatory view showing an example of the data configuration of the TLB 400. Here, an example is shown in which the number of entries is 64.

The TLB 400 has an entry number column 402, a virtual address column 404, a physical address column 406, a process ID column 408, a size column 410, and an attribute column 412.

The entry number column 402 stores an entry number for identifying the entry uniquely in the TLB 400.

The virtual address column 404 stores a virtual address in a process.

The physical address column 406 stores an address of the physical memory 120 or the like corresponding to the virtual address. For example, as shown in FIG. 4, entry numbers 0 and 60 are assigned to the physical memory 120, and entry numbers 1 and 2 are assigned to the I/O space 130.

The process ID column 408 stores a process ID for identifying a process uniquely under the OS using the TLB 400, and the process operates using the virtual address stored in the virtual address column 404.

The size column 410 stores the size of the virtual address assigned to the physical address. That is, with a virtual address and a physical address stored in the virtual address column 404 and the physical address column 406 as top addresses, a continuous region corresponding to the size is assigned.

The attribute column 412 stores an attribute regarding the assigned memory. Specifically, the attribute column 412 stores whether or not the cache 112 is used, a supervisor's access right (read (R), write (W), execution (E)) with respect to the memory, and a user's access right (read (R), write (W), execution (E)) with respect to the memory, for example. For example, as shown in FIG. 4, the entry number 0 indicates that the cache 112 is used and the supervisor's access right is R/W/E and there is no user's access right, the entry numbers 1 and 2 indicate that the cache 112 is not used and the supervisor's access right is R/W/E and there is no user's access right, and the entry number 60 indicates that the cache 112 is used and the supervisor's access right is R/W/E and the user's access right is R/W/E. In addition, in the example shown in FIG. 4, the process in which a process ID is 0 is a process which operates in a supervisor mode, and the process in which process IDs are 1 and 2 is a process which operates in a user mode.

The MMU 116 performs processing for address conversion from a virtual address to a physical address and management of the TLB 114. In addition, the processing using the MMU 116, which will be described below, may be performed by the CPU 110 (OS) including the MMU 116 or may be performed by the CPU 110 (OS).

When changing a process to an executable state, a memory capacity corresponding to the process in the TLB 114 is set. Here, these memory capacities are determined based on the memory capacity that the process requires, the memory capacity of an unused continuous region in the physical memory 120, and the memory capacity determined based on restriction of memory size dependent on the CPU 110. Moreover, four kinds of memory capacities appear as the "memory space" in this sentence, and their meaning is as follows. (1) "Memory capacity that the process requires" refers to a memory region used by the process. As a specific example, a text/bss/data region and the like to be described later correspond thereto. (2) "Memory capacity of an unused continuous region in the physical memory 120" refers to a continuous empty capacity of the physical memory 120 in this system, (3) "Restriction of memory size dependent on the CPU 110" is related to an adaptable memory size to be set in the TLB 114. (4) "Memory capacity corresponding to the process in the TLB 114" is related to a memory size (size column 410) which can be actually set in the TLB 114, and the "determined memory capacity" is set. In addition, "Memory capacity corresponding to the process in the TLB 114 is set" is related with a memory capacity in one entry of the TLB 114.

As the memory capacity that the process requires, which is used by the MMU 116, it is possible to include a memory capacity of a dynamic memory dynamically assigned at the time of execution of the process or a memory capacity of a shared memory used between a plurality of processes. That is, not only the static data which is the data capacity set beforehand before execution of a process but also the shared memory and the dynamic data, the data volume of which changes and which are needed at the time of execution of the process, are prepared for the situation when changing the process to an executable state. For example, a programmer of a program for the process may set the required memory capacity, which is set beforehand as dynamic data and a shared memory, in the program and the MMU 116 may analyze the setting and set a physical address in the TLB 114 when changing the process to an executable state.

When the memory capacity of a dynamic memory or a shared memory is required at the time of execution of a process after changing the process to an executable state, the MMU 116 may set the memory capacity corresponding to the process in the TLB 114 based on the memory capacity of the dynamic memory or shared memory, the memory capacity of an unused continuous region in a physical memory, and the memory capacity determined based on the restriction of memory size dependent on the CPU 110. That is this corresponds to the case where a dynamic memory or its shared memory is additionally needed while the process is being executed.

When the memory capacity of a memory secured as a dynamic memory or a shared memory in changing a process to an executable state is insufficient after changing the process to the executable state, the MMU 116 may set the memory capacity corresponding to the process in the TLB 114 based on the memory capacity of the dynamic memory or shared memory requested from the process, the memory capacity of an unused continuous region in a physical memory, and the memory capacity determined based on the restriction of memory size dependent on the CPU 110. That is, the dynamic data and the shared memory are also prepared for the case where the set memory capacity is insufficient (for example, a case where a programmer of the program set the minimum memory capacity needed but the memory capacity larger than the set memory capacity is actually needed) when changing a process to an executable state.

When a virtual address or a physical address cannot be set with the determined memory capacity, the MMU 116 may determine the memory capacity again. That is, this is to cope with the case where a physical address or a virtual address cannot be set with the memory capacity when trying to set the physical address or the virtual address after setting the memory capacity in the TLB 114.

Figure 2:
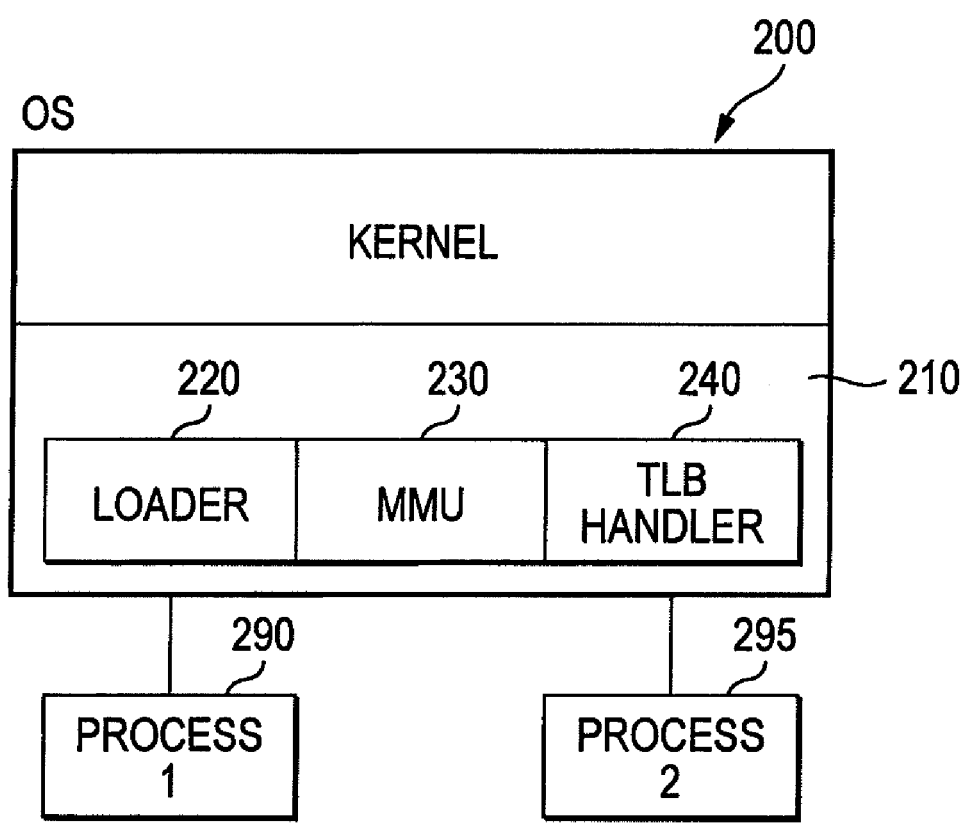
FIG. 2 is a view showing the conceptual module configuration in a configuration example of the present exemplary embodiment.

FIG. 2 is a view showing the conceptual module configuration in a configuration example of the present exemplary embodiment.

An OS 200 has a kernel 210. The kernel 210 has a loader 220, an MMU 230, and a TLB handler 240. The loader 220 changes a process to an executable state in response to a user's operation or an instruction from another process. That is, the loader 220 serves to start a process. For example, in a C language or the like, it corresponds to executing a main( ) function. In this case, it is necessary to match a virtual address and a physical address used in the process with each other. For this reason, the MMU 230 is made to perform setting of the TLB 114. In addition, in the example of FIG. 2, a state after starting a process 1 290 and a process 2 295 is shown.

The MMU 230 makes the TLB handler 240 perform setting of the TLB 114 based on an instruction from the loader 220, so that address conversion in process execution is performed based on the TLB 114. Moreover, when a dynamic memory or a shared memory is needed during execution of the process 1 290 and the process 2 295, the MMU 230 makes the TLB handler 240 perform setting of the TLB 114. The TLB handler 240 performs setting of the TLB 114 based on an instruction from the MMU 230.

Figure 3:
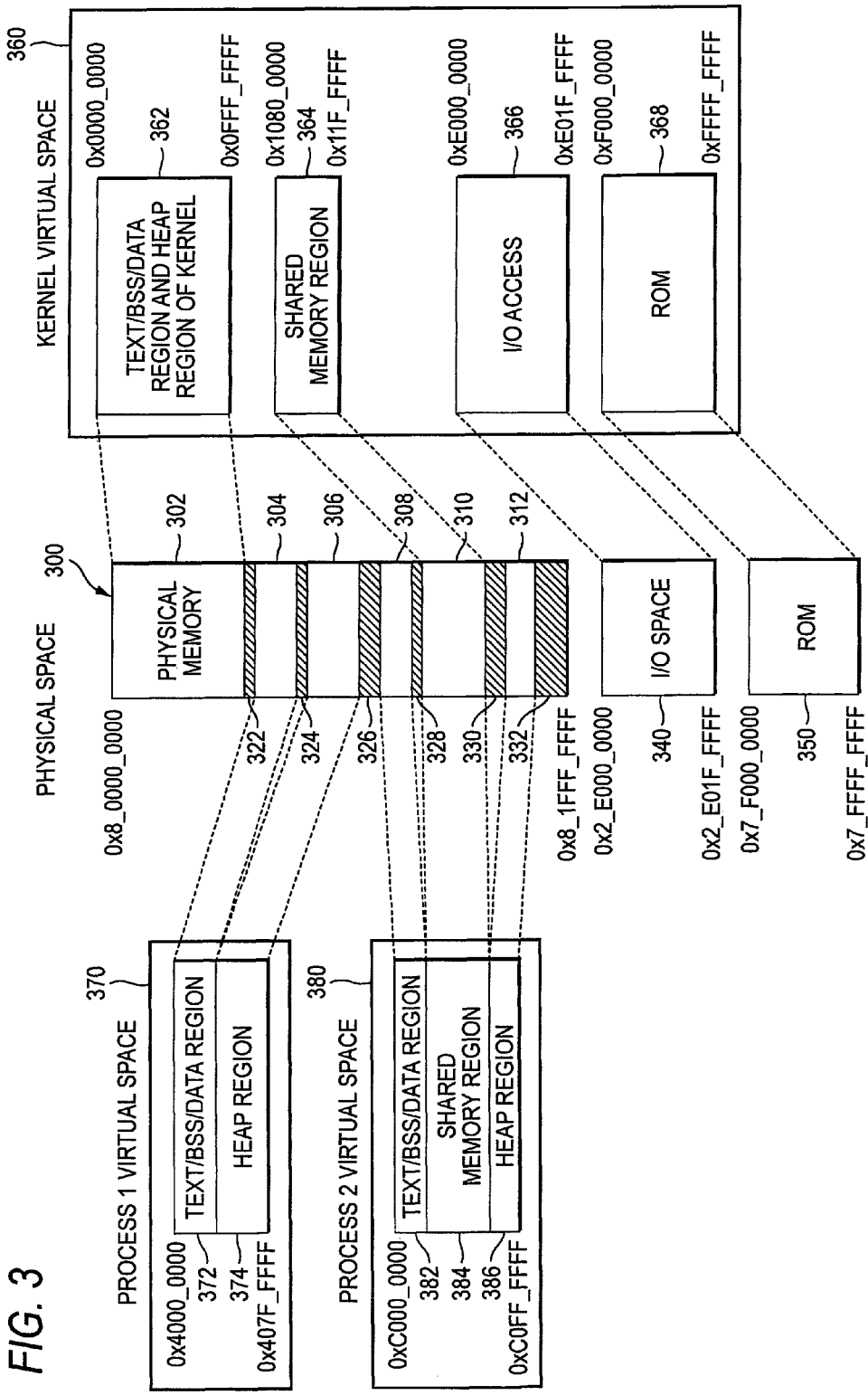
FIG. 3 is an explanatory view showing an example in which a physical space and a virtual space are associated with each other in a memory.

FIG. 3 is an explanatory view showing an example in which a physical space and a virtual space are associated with each other in a memory. The physical space and the virtual space are matched with each other by the TLB 400 illustrated in FIG. 4.

A process 1 virtual space 370 has a text/bss/data region 372 and a heap region 374.

The text/bss/data region 372 is a region of static data and is assigned to a secured physical region 304 of a physical memory 300. In addition, the text region is a program code region, the bss (Block Starting with Symbol) region is a region for a global variable which does not have an initial value, and the data region is a region of data which needs initialization.

The heap region 374 is a region of dynamic data and is assigned to a secured physical region 306 of the physical memory 300.

A process 2 virtual space 380 has a text/bss/data region 382, a shared memory region 384, and a heap region 386. Unlike the process 1 virtual space 370, the process 2 virtual space 380 has the shared memory region 384 in order to perform communication with another process. The text/bss/data region 382, the shared memory region 384, and the heap region 386 are assigned to a secured physical region 308, a secured physical region 310, and a secured physical region 312 of the physical memory 300, respectively.

A kernel virtual space 360 has a text/bss/data region and heap region of kernel 362, a shared memory region 364, an I/O access 366, and a ROM 368.

The text/bss/data region and heap region of kernel 362 and the shared memory region 364 are assigned to a secured physical region 302 and a secured physical region 310 of the physical memory 300, respectively. The I/O access 366 is assigned to an I/O space 340, and the ROM 368 is assigned to a ROM 350.

Figure 5:
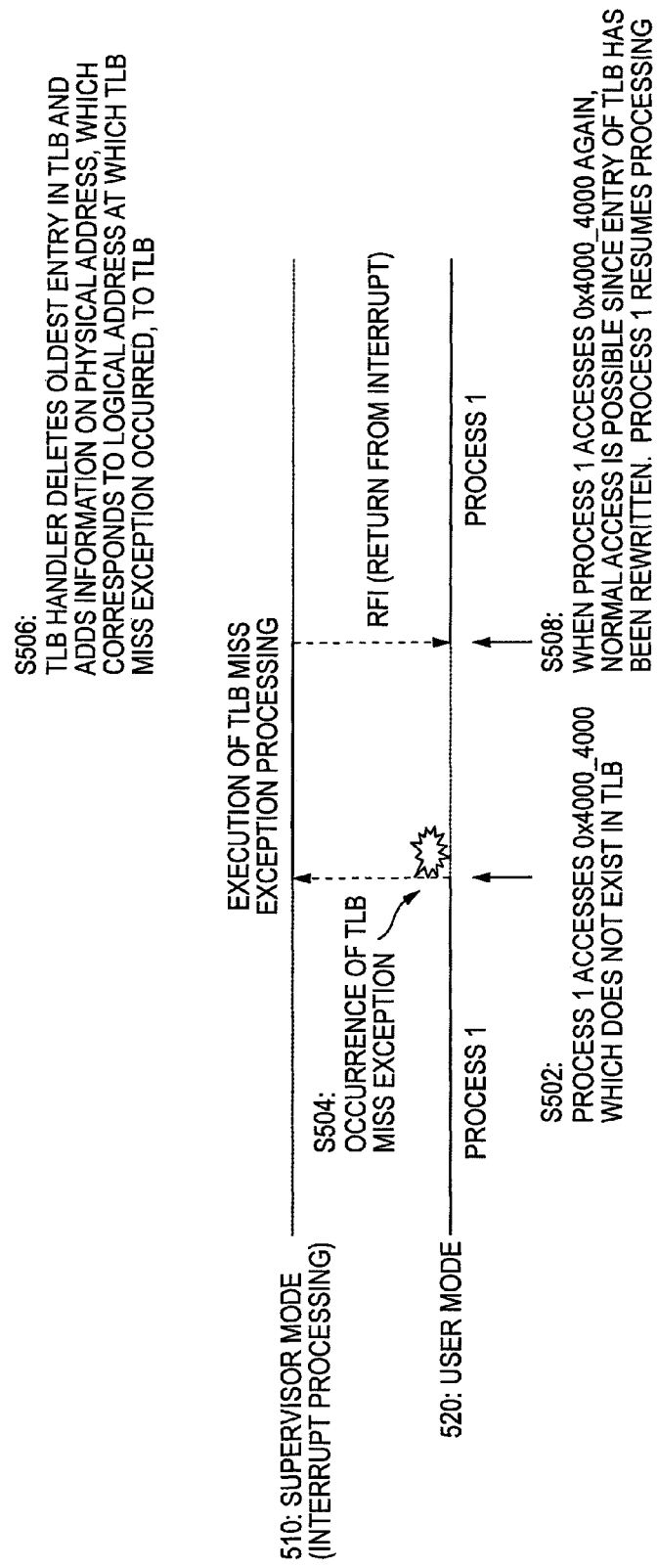
FIG. 5 is an explanatory view showing an example of processing of TLB miss exceptional.

FIG. 5 is an explanatory view showing an example of processing of TLB miss exception. As described above, this is processing when accessing a virtual address which is not set in the TLB 114.

In step S502, a process 1 accesses 0x4000_4000, which does not exist in the TLB 114, in a user mode 520.

In step S504, TLB miss exception occurs. That is, an interrupt occurs and the control moves from the user mode 520 to supervisor mode 510.

In step S506, the TLB handler 240 deletes the oldest entry in the TLB 114 and adds the information on a physical address, which corresponds to the logical address at which TLB miss exception occurred, to the TLB 114. Then, the process returns from the interruption and the control moves from the supervisor mode 510 to the user mode 520. In addition, in order to determine whether or not the entry is old, a column in which a use time and a setup time are stored may be provided in the TLB 400.

FIGS. 6A and 6B are explanatory views showing an example of change of the TLB 400 in processing of TLB miss exception. Since the oldest entry in the TLB 400 is an entry number 63, the oldest entry is replaced with a new entry 610 for example, setting of a virtual address 0x4000_4000 in a process ID1 and a physical address 0x8_1004_4000 corresponding to the virtual address). In addition, the MMU 230 stores a page table including an entry, which is set when changing a process such as the new entry 610 to an executable state in the TLB 400, in a main memory and performs exchange between a part of the page table and the TLB 400 when TLB miss exception processing occurs.

In step S508, when the process 1 accesses 0x4000_4000 again in the user mode 520, normal access is possible since the entry of the TLB has been rewritten. That is, since there is a virtual address 0x4000_4000 in the entry number 63, the process 1 resumes the processing based on it.

Figure 7:
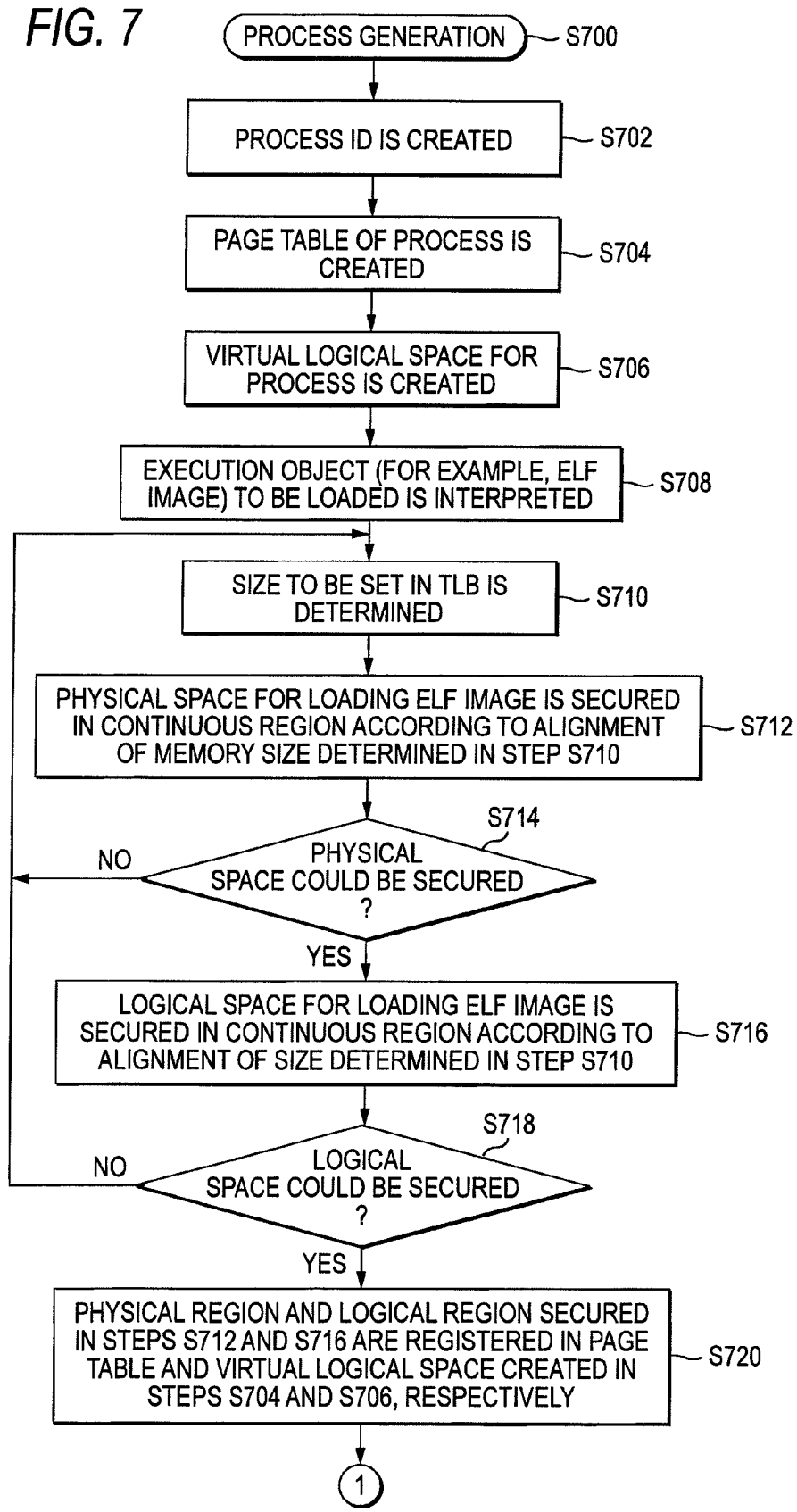
FIG. 7 is a flow chart showing an example of processing in the present exemplary embodiment.
Figure 8:
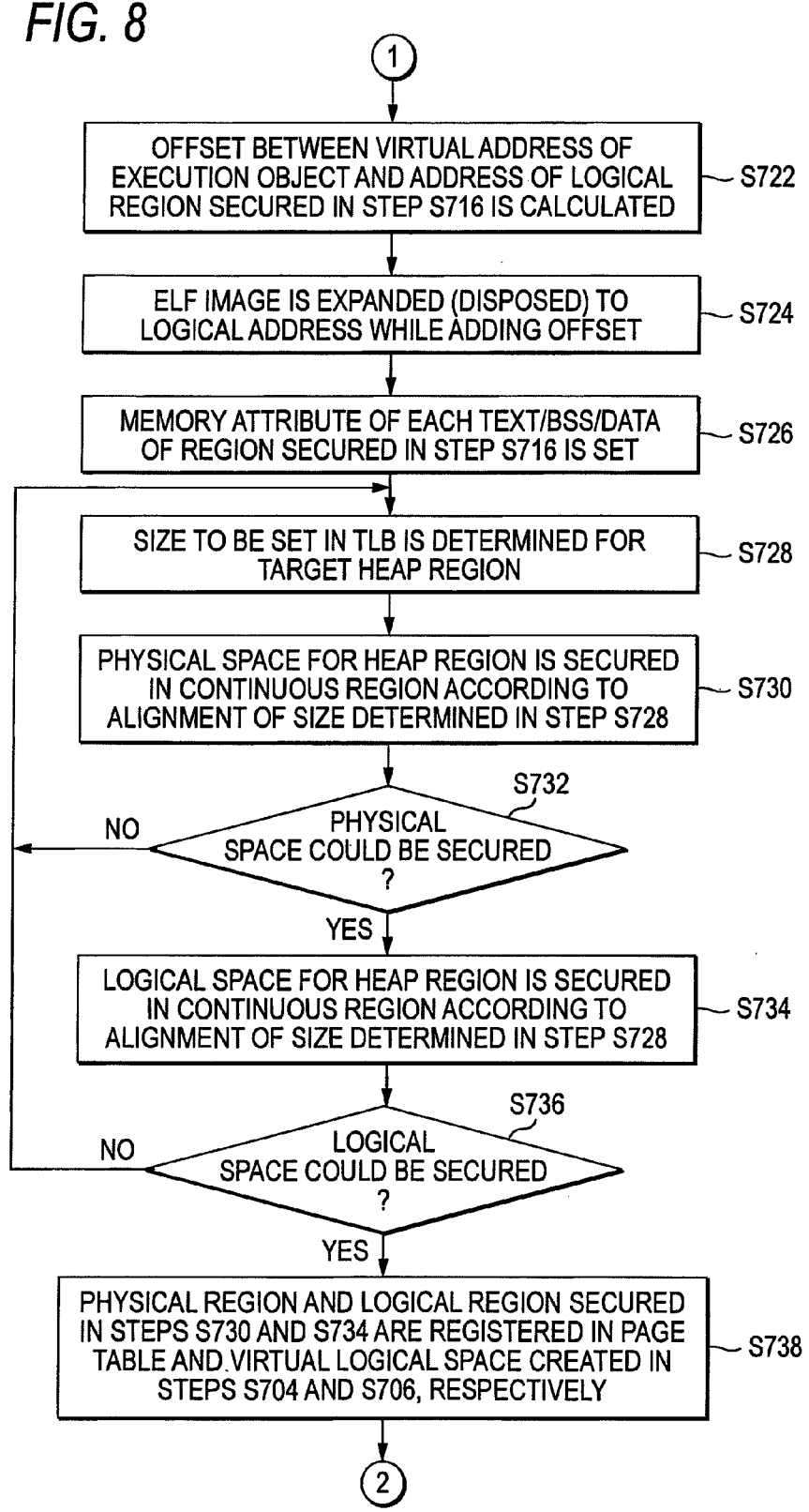
FIG. 8 is a flow chart showing an example of processing in the present exemplary embodiment.
Figure 9:
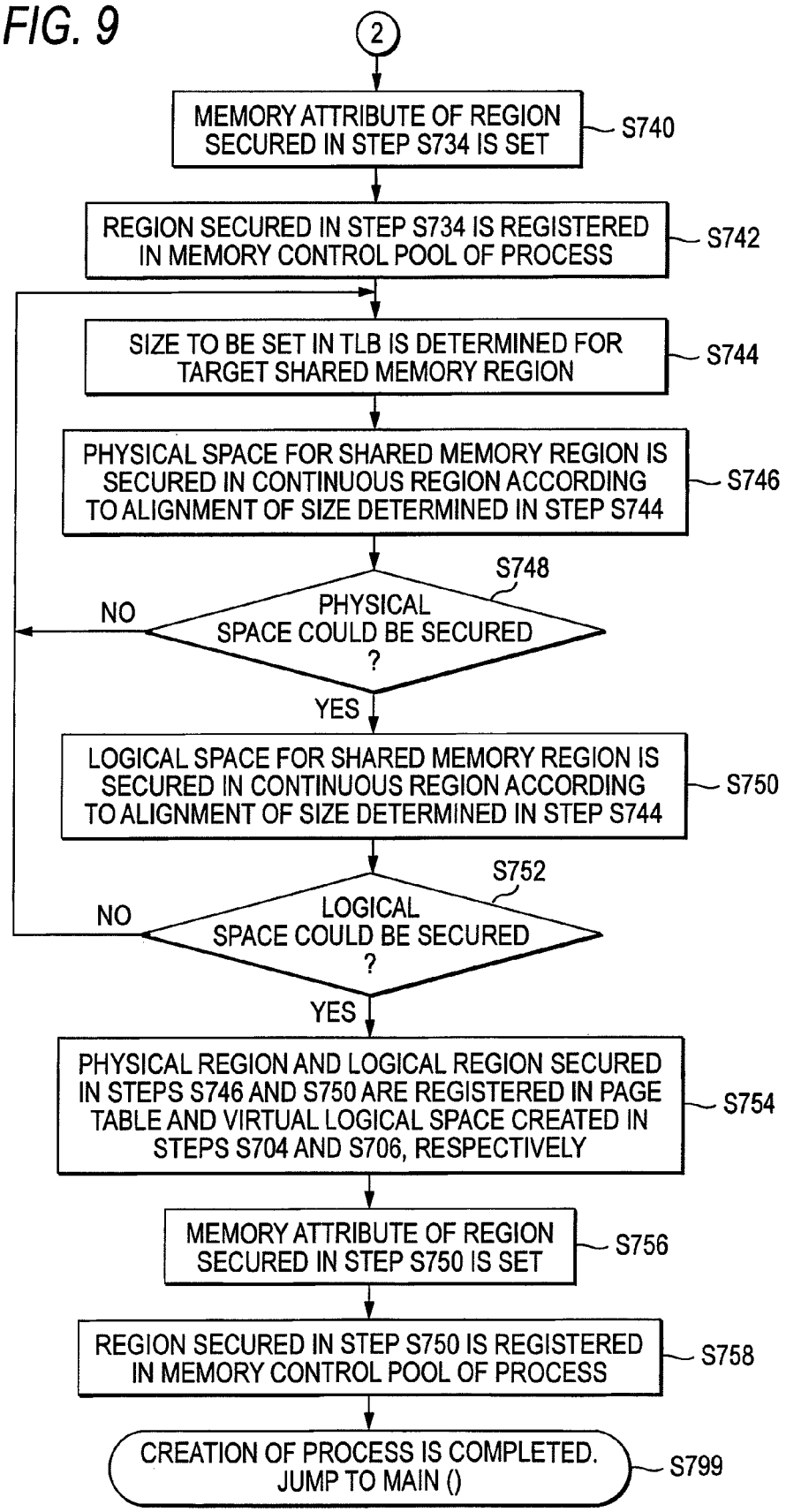
FIG. 9 is a flow chart showing an example of processing in the present exemplary embodiment.

FIGS. 7 to 9 are flow charts showing an example of processing in the present exemplary embodiment. In addition, this example of processing is performed when changing a process to an executable state.

In step S702, the loader 220 creates a process ID. That is, in order to change the process to an executable state, a process ID for uniquely identifying a process when executing an execution object of a program is created.

In step S704, an empty page table of the process is created. In order to create the TLB 400, a page table with the same structure as the TLB 400 is created in a main memory. In this case, the number of entries is larger than the TLB 400, and the number does not need to be limited.

In step S706, an empty virtual logical space for a process is created. In order to create the TLB 400, a table (for example, correspondence between a process ID and a memory address assigned to the process) for managing the virtual logical space is created in the main memory.

In step S708, the execution object (for example, an ELF (Executable and Linking Format) image) to be loaded is interpreted. For example, the text/bss/data region 372 illustrated in FIG. 3 is extracted from the execution object. That is, the required size of text, bss, and data regions which are static data is determined. This becomes a part of memory size (required memory size itself if a heap region and a shared memory are not necessary) that the process requires.

In step S710, the size (size column 410) to be set in the TLB 400 is determined. That is, the continuous memory size of a memory region of static data required for the process is determined. In this case, the memory size is determined such that the number of entries in the TLB 400 used is decreased (that is, the continuous memory size to be secured is increased) and the fragmented size is decreased. Here, the memory size determined such that the fragmented size is decreased indicates a memory size of an unused continuous region in a physical memory and a memory size determined based on restriction of memory size dependent on the CPU 110. In addition, it is also possible to save a memory (not to set an unnecessarily larger memory size than the required memory size of a process).

Moreover, when the process returns from step S714 or step S718, the memory size is changed so as to be smaller than the memory size determined previously.

In step S712, a physical space for loading an ELF image or the like is secured in the continuous region according to the alignment of the memory size determined in step S710. Here, a case where a continuous region based on the alignment cannot be secured may occur. This is because the memory size is determined based on the size of an unused region of a physical space in step S710, but it is not determined whether or not the continuous region is based on the alignment.

In step S714, it is determined whether or not the physical space could be secured. When the physical space could be secured, the process proceeds to step S716. In other cases, the process from step S710 is repeated.

In step S716, a logical space for loading an ELF image or the like is secured in the continuous region according to the alignment of the size determined in step S710. Here, a case where a continuous region based on the alignment cannot be secured may occur. This is because it is not determined whether or not there is a size of an unused region of a logical space and whether or not the continuous region is based on the alignment in step S710. Moreover, when a plurality of processes uses one virtual logical space (that is, when a plurality of processes is disposed in the virtual logical space), it is secured so as not to overlap a memory in a virtual space which has been already secured in another process or its own process. In addition, in the case of an OS which sets a virtual space for every process, overlapping with another process is not allowed. Accordingly, it is preferable to secure the virtual space so as not to overlap a memory in a virtual space which has been already secured in its own process.

In step S718, it is determined whether or not the logical space could be secured. When the logical space could be secured, the process proceeds to step S720. In other cases, the process from step S710 is repeated.

In step S720, the physical region and the logical region secured in steps S712 and S716 are registered in the page table and the virtual logical space created in steps S704 and S706, respectively.

Moreover, in the case where the processing from step S710 to step S720 is performed using the known technique, the physical space and the virtual logical space for loading an ELF image are secured in the fixed size and are registered in the page table and the virtual logical space created in steps S704 and S706, respectively. In this case, the fixed memory capacity set beforehand is set. Accordingly, since the secured physical space is not a continuous region, addresses of the physical space and virtual logical space are not aligned in the size which can be set in the TLB 400. That is, since the size set in the TLB 400 becomes a page unit, processing of TLB miss exception may occur a lot.

In step S722, an offset between the virtual address of the execution object and the address of the logical region secured in step S716 is calculated. That is, an offset (difference) between the virtual address of an ELF image or the like, which has been temporarily determined by a compiler, and the virtual address secured in step S716 is calculated.

In step S724, the ELF image or the like is expanded (disposed) to the logical address while adding the offset calculated in step S722.

In step S726, a memory attribute of each text/bss/data of the region secured in step S716 is set. That is, the attribute column 412 of the TLB 400 is set (whether or not the cache 112 is used, a supervisor's access right, a user's access right, and the like are set).

In step S728, the size to be set in the TLB 400 is determined for a target heap region. This is processing corresponding to step S710. In addition, if a heap region is not necessary in the process, the process proceeds to step S744.

In step S730, a physical space for the heap region is secured in a continuous region according to the alignment of the size determined in step S728. This is processing corresponding to step S712.

In step S732, it is determined whether or not the physical space could be secured. When the physical space could be secured, the process proceeds to step S734. In other cases, the process from step S728 is repeated. This is processing corresponding to step S714.

In step S734, a logical space for the heap region is secured in a continuous region according to the alignment of the size determined in step S728. This is processing corresponding to step S716.

In step S736, it is determined whether or not the logical space could be secured. When the logical space could be secured, the process proceeds to step S738. In other cases, the process from step S728 is repeated. This is processing corresponding to step S718.

In step S738, the physical region and the logical region secured in steps S730 and S734 are registered in the page table and the virtual logical space created in steps S704 and S706, respectively. This is processing corresponding to step S720.

In step S740, a memory attribute of the region secured in step S734 is set. This is processing corresponding to step S726.

In step S742, the region secured in step S734 is registered in a memory control pool of the process. In addition, the memory control pool herein manages the space of the heap region with a size set beforehand.

In step S744, the size to be set in the TLB 400 is determined for a target shared memory region. This is processing corresponding to step S728.

In step S746, a physical space for the shared memory region is secured in a continuous region according to the alignment of the size determined in step S744. This is processing corresponding to step S730.

In step S748, it is determined whether or not the physical space could be secured. When the physical space could be secured, the process proceeds to step S750. In other cases, the process from step S744 is repeated. This is processing corresponding to step S732.

In step S750, a logical space for the shared memory region is secured in a continuous region according to the alignment of the size determined in step S744. This is processing corresponding to step S734.

In step S752, it is determined whether or not the logical space could be secured. When the logical space could be secured, the process proceeds to step S754. In other cases, the process from step S744 is repeated. This is processing corresponding to step S736.

In step S754, the physical region and the logical region secured in steps S746 and S750 are registered in the page table and the virtual logical space created in steps S704 and S706, respectively. This is processing corresponding to step S738.

In step S756, a memory attribute of the region secured in step S750 is set. This is processing corresponding to step S740.

In step S758, the region secured in step S750 is registered in the process memory control pool. This is processing corresponding to step S742.

In step S799, creation of the process is completed. Then, in order to execute the main( ) function, it jumps to a memory in which the object of the main( ) function is stored. Thereafter, processing of TLB miss exception occurs, and the entries set in the page table in this flow chart are inserted or exchanged into the TLB 400.

Figure 10:
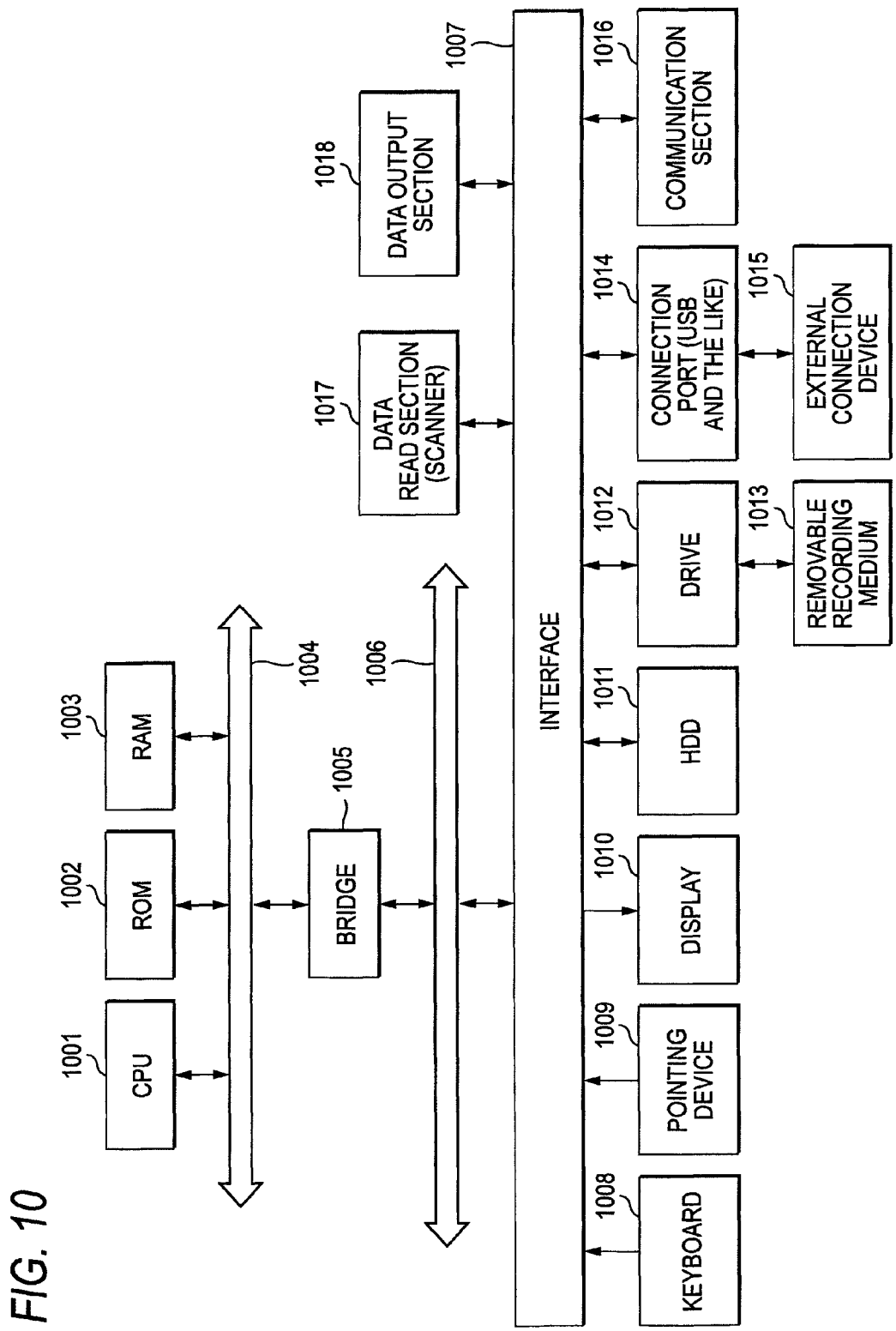
FIG. 10 is a block diagram showing an example of the hardware configuration of a computer for realizing the present exemplary embodiment.

Referring to FIG. 10, an example of the hardware configuration of an image processing system to which the present exemplary embodiment has been applied will be described. The configuration shown in FIG. 10 is an example of the hardware configuration including a data read section 1017, such as a scanner, and a data output section 1018, such as a printer.

A CPU (Central Processing Unit) 1001 is a control unit that executes processing according to a computer program in which the execution sequences of modules described in the above exemplary embodiment, that is, the execution sequences of the loader 220, the MMU 230, the TLB handler 240, and the like are written.

A ROM (Read Only Memory) 1002 stores a program, an operation parameter, and the like that the CPU 1001 uses. A RAM (Random Access Memory) 1003 is a physical memory in the present exemplary embodiment and stores a program used at the time of execution of the CPU 1001, parameters that appropriately vary in the execution, and the like. These are connected to each other by a host bus 1004, such as a CPU bus.

The host bus 1004 is connected to an external bus 1006, such as a PCI (Peripheral Component Interconnect/interface) bus, through a bridge 1005.

A keyboard 1008 and a pointing device 1009, such as a mouse, are input devices operated by an operator. A display 1010 is a liquid crystal display or a CRT (Cathode Ray Tube), for example, and displays various kinds of information as text or image information.

A HDD (Hard Disk Drive) 1011 includes a hard disk therein, drives the hard disk, and records or reproduces a program or information executed by the CPU 1001. The read image data is stored in a hard disk. In addition, various computer programs, such as various kinds of other data processing programs, are stored.

A drive 1012 reads data or a program recorded in a mounted removable recording medium 1013, such as a magnetic disk, an optical disk, a magneto-optic disk, or a semiconductor memory, and transmits the read data or program to the RAM 1003 connected thereto through an interface 1007, the external bus 1006, the bridge 1005, and the host bus 1004. The removable recording medium 1013 may also be used as the same data recording area as the hard disk.

A connection port 1014 is a port connected to an external connection device 1015 and has connecting portions, such as USB and IEEE 1394. The connection port 1014 is connected to the CPU 1001 and the like through the interface 1007, the external bus 1006, the bridge 1005, the host bus 1004, and the like. A communication section 1016 is connected to the network and executes processing for data communication with the outside. The data read section 1017 is a scanner, for example, and executes document read processing. The data output section 1018 is a printer, for example, and executes document data output processing.

In addition, the hardware configuration of the information processing system shown in FIG. 10 is an example of the configuration. A configuration capable of executing the present exemplary embodiment may be adopted in the present exemplary embodiment without being limited to the configuration shown in FIG. 10. For example, some of the modules may be realized using dedicated hardware (for example, an Application Specific Integrated Circuit: ASIC). Moreover, examples of the image processing system include a copying machine, a facsimile, a scanner, a printer, a complex machine (image processing apparatus having two or more functions of a scanner, a printer, a copying machine, and a facsimile), and the invention may also be used for household appliances, an automobile, an elevator, and the like in addition to the image processing system.

In the above-described exemplary embodiment, the use in the embedded OS has been illustrated. However, the invention may also be adopted in an OS for general-purpose computers (more specifically, an OS which adopts paging processing). Moreover, FIGS. 7 to 9 show an example of processing when changing a process to an executable state. However, it is also possible to perform the processing from steps S728 to S742 and the processing from steps S744 to S758 when the memory capacity of a dynamic memory or a shared memory of a process is needed (that is, a memory is not secured until it is needed, but securing a memory is delayed) after executing the process. Moreover, after executing a process, the processing from steps S728 to S742 and the processing from steps S744 to S758 may be performed when the memory capacity is insufficient with a dynamic memory or a shared memory secured beforehand when the process was executed. More specifically, this is performed when a malloc( ) function or the like is called in the program.

In addition, it may be determined whether or not to execute the processing in the present exemplary embodiment according to the process (for example, a process ID, a process name, and an option when generating a process). That is, when processing in the present exemplary embodiment is not performed, processing using the technique in the related art is performed. In addition, the size of region to be assigned may be determined according to the empty capacity of a physical space.

In addition, the program described above may be provided in a state where the program is stored in a recording medium or the program may be provided through a communication unit. In this case, the program may be regarded as the invention of a "computer-readable recording medium in which a program is recorded", for example.

The "computer-readable recording medium in which a program is recorded" refers to a recording medium that can be read by a computer recorded with a program, which is used for installation, execution, distribution, and the like of the program.

In addition, examples of recording media include: in association with a digital versatile disk (DVD), "DVD-R, DVD-RW, DVD-RAM, and the like" that are standards established by a DVD forum and "DVD+R, DVD+RW, and the like" that are standards established by a DVD+RW forum; in association with a compact disk (CD), a read only memory (CD-ROM), a CD recordable (CD-R), and a CD rewritable (CD-RW), and the like; a Blu-ray disk (registered trademark); a magneto-optic disk (MO); a flexible disk (FD); a magnetic tape; a hard disk; a read only memory (ROM); an electrically erasable and programmable read only memory (EEPROM); a flash memory; and a random access memory (RAM).

In addition, the program or a part of the program may be stored or distributed in a state where the program or the part of the program is recorded in the recording media. In addition, the program may be transmitted by communication, for example, through a wireline network such as a local area network (LAN), a metropolitan area network (MAN), a wide area network (WAN), Internet, an intranet, and an extranet or through a wireless communication network. Alternatively, the program may be transmitted through a transmission medium obtained by combination of those described above or may be carried on a carrier.

In addition, the program may be a part of another program or may be recorded on a recording medium together with a separate program. In addition, the program may be separated and recorded in a plurality of recording media. In addition, the program may be recorded in any kind of format including compression, encryption, and the like as long as the program can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory that stores (i) a process identifier for identifying a process uniquely, (ii) a virtual address, in a virtual memory space, assigned to the process, (iii) a physical address, in a physical memory, corresponding to the virtual address, and (iv) a continuous memory capacity assigned to the process, in association with each other; and
   a memory capacity determining section that, when changing the process to an executable state, determines the continuous memory capacity to be stored in the memory,
   wherein the memory capacity determining section determines the continuous memory capacity based on:
   a first memory capacity that the process requires;
   a second memory capacity of an unused continuous region in the physical memory; and
   a third memory capacity based on restriction of memory size of the memory dependent on a central processing unit in a computer.

2. The information processing apparatus according to claim 1,
   wherein the first memory capacity that the process requires includes a memory capacity of a dynamic memory dynamically assigned at a time of execution of the process or a memory capacity of a shared memory used between a plurality of processes.

3. The information processing apparatus according to claim 1,
   wherein when a fourth memory capacity of a dynamic memory dynamically assigned at a time of execution of the process or a fifth memory capacity of a shared memory used between a plurality of processes is required after changing the process to the executable state, the memory capacity determining section determines the continuous memory capacity to be stored in the memory based on:
   the fourth memory capacity of the dynamic memory or the fifth memory capacity of the shared memory;
   the second memory capacity of the unused continuous region in the physical memory; and
   the third memory capacity based on the restriction of memory size dependent on the central processing unit in the computer.

4. The information processing apparatus according to claim 2,
   wherein when a memory capacity secured as the dynamic memory or the shared memory is insufficient after changing the process to the executable state, the memory capacity determining section determines the continuous memory capacity to be stored in the memory based on:
   a fourth memory capacity of the dynamic memory or the shared memory requested from the process;
   the second memory capacity of the unused continuous region in the physical memory; and
   the third memory capacity based on the restriction of memory size dependent on the central processing unit in the computer.

5. The information processing apparatus according to claim 1,
   wherein when the virtual address or the physical address cannot be set with the determined continuous memory capacity, the memory capacity determining section determines the continuous memory capacity again.

6. An information processing method comprising:
   storing, in a memory, (i) a process identifier for identifying a process uniquely, (ii) a virtual address, in a virtual memory space, assigned to the process, (iii) a physical address, in a physical memory, corresponding to the virtual address, and (iv) a continuous memory capacity assigned to the process, in association with each other; and
   determining, when changing the process to an executable state, the continuous memory capacity to be stored in the memory,
   wherein the determining comprises determining the continuous memory capacity based on:
   a first memory capacity that the process requires;
   a second memory capacity of an unused continuous region in the physical memory; and
   a third memory capacity based on restriction of memory size of the memory dependent on a central processing unit in a computer.

7. A non-transitory computer readable medium storing a program causing a computer to execute a process, the process comprising:
   storing, in a memory, (i) a process identifier for identifying a process uniquely, (ii) a virtual address, in a virtual memory space, assigned to the process, (iii) a physical address, in a physical memory, corresponding to the virtual address, and (iv) a continuous memory capacity assigned to the process, in association with each other; and
   determining, when changing the process to an executable state, the continuous memory capacity to be stored in the memory,
   wherein the determining comprises determining the continuous memory capacity based on:
   a first memory capacity that the process requires;
   a second memory capacity of an unused continuous region in the physical memory; and
   a third memory capacity based on restriction of memory size of the memory dependent on a central processing unit in a computer.

* * * * *